United States Patent

[11] 3,570,469

| | | |
|---|---|---|
| [72] | Inventor | Denton H. Jones<br>3504 S. 100th Ave., Omaha, Nebr. 68124 |
| [21] | Appl. No. | 21,786 |
| [22] | Filed | Mar. 23, 1970 |
| [45] | Patented | Mar. 16, 1971 |

[54] BARBECUE GRILL WITH DISPOSABLE TOP
9 Claims, 3 Drawing Figs.

[52] U.S. Cl. .................................................. 126/25R,
99/444, 126/9A, 126/39M
[51] Int. Cl. .......................................................... A47j 37/00,
F24b 3/00
[50] Field of Search .................................................. 126/9, 9
(AX), 25, 39 (MX); 99/444 (X), 445, 446, 450;
229/3.5 (MF)

[56] References Cited
UNITED STATES PATENTS

| | | | |
|---|---|---|---|
| 3,082,757 | 3/1963 | Hohe ............................ | 126/25 |
| 3,323,508 | 6/1967 | Holman ........................ | 126/25 |
| 3,273,556 | 9/1966 | Mogensen .................... | 99/450X |
| 3,141,590 | 7/1964 | Anderson ..................... | 126/39MX |
| 3,509,814 | 5/1970 | Karapetian ................... | 126/9AX |

Primary Examiner—Charles J. Myhre
Attorney—Hiram A. Sturges

ABSTRACT: A barbecue grill having a fire holder, a grill top, anchoring means disposed in anchoring engagement with the grill top, the grill top having a central meat-receiving portion which is unsupported by means other than the edge portions of the grill top itself.

Patented March 16, 1971 3,570,469
FIG. 1
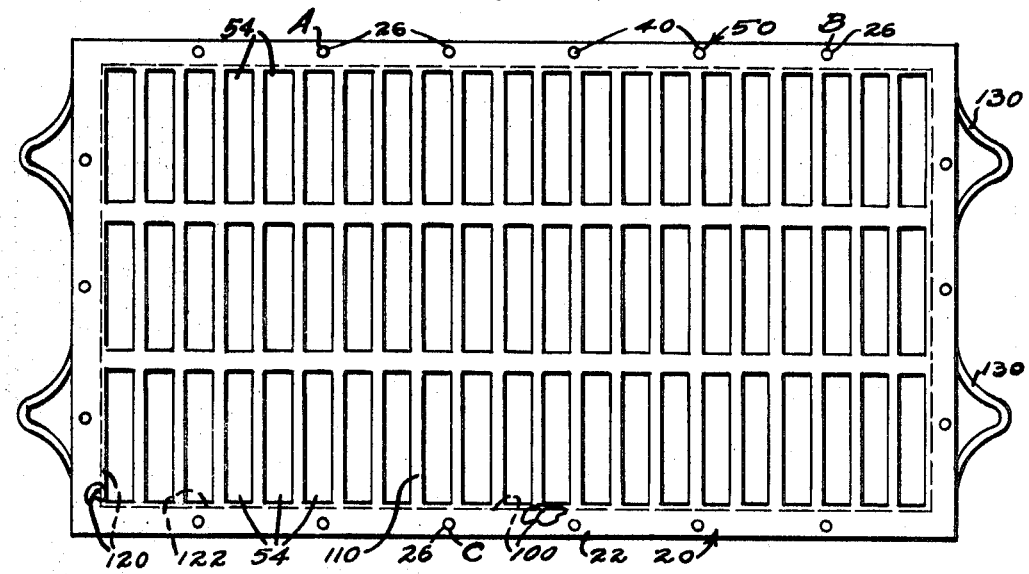
FIG. 2
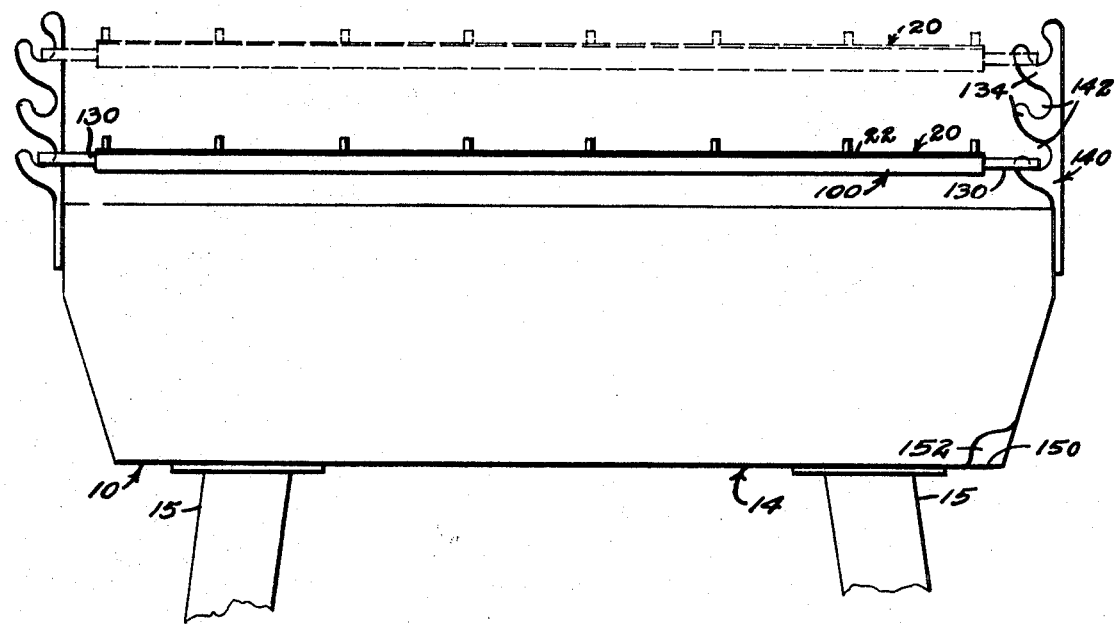
FIG. 3
INVENTOR.
DENTON H. JONES
BY Hiram A. Sturges,
Agent 3,570,469

BARBECUE GRILL WITH DISPOSABLE TOP

FIELD OF THE INVENTION

This invention is in the field of barbecue grills having disposable top portions.

DESCRIPTION OF THE PRIOR ART

Attempts have been made in the prior art to devise a grill having a disposable top for the purpose of eliminating the cleaning which is such a nuisance with grills of the permanent type.

In attempts made to solve this problem in the prior art, three basic approaches have been tried but none has gained general public acceptance.

The first of these prior art approaches has been to make the grill top of a foil so thin that it cannot support itself but designed to rest upon a conventional heavy grid for the purpose of placing metal of the grill top between the meat to be cooked and the conventional grid. With such foil tops perforated, the meat will cook, but the odor from the uncleaned grid is offensive.

In using perforated foil, there are always places where the meat fat can pass through onto the supporting grid and contaminate it so that the nuisance of cleaning it is really not eliminated.

A second approach to this problem has been to provide a grill top which is weak for the purpose of disposability but which is simply laid over a supporting frame.

With this type of approach, the grill top would sag and bend under the weight of the meat and so a wire support is placed under the grill top to support its central portion. The disadvantage of this approach is that the wire support must itself be cleaned because it would become contaminated and odorous. The plan of throwing away the wire support for the central portion along with the grill top in order to completely eliminate the cleaning problem is impractical for two reasons. The main reason is that the cost of the central wire support adds to the cost of the grill top to make disposability excessively costly for most users, in my opinion. The second disadvantage of this type is that the wire support for the central portion of the grill cannot be collapsed into compact size for being thrown away as well as could be desired, and sometimes it is desired to throw away these items in kitchen garbage container of small size.

The third prior art type of approach to the disposable top problem has been the concept of using disposable top material so thick and heavy and strong that its center section is substantially self-supporting. This approach can be called the "shelf approach" because the strong, but expensive, disposable cover is upheld at its edges at critical points by shelf-bracket means extending under the cover and engaging the underside of the cover without any anchoring effect so that the cover itself must be sufficiently strong that it does not sag in its center and simply pull off of the shelf brackets.

SUMMARY OF THE INVENTION

A grill comprising a fire holder, a grill top, the grill top having a central meat-receiving portion disposed in an area thereof bounded by points of anchoring engagement of anchoring means with respect to the top, the points being at least three in number whereby the central portion located between the anchoring points, and which latter is unsupported by means other than its own strength, is of an area large enough to receive at least one steak serving of substantial size, the unsupported central portion being of such a large area and the grill top being so thin and so flexible and lacking in stiffness for achieving economical disposability, that to support meat adequately proportional to the area of its unsupported central meat-receiving portion, the edges of the grill top at at least three points must be prevented, by means substantially more adequate than mere support of the undersurface of edges thereof, from moving inwardly due to a bending or sagging of the grill top.

The combination in which the anchoring means comprises at least three spaced upwardly extending posts and portions of the grill top edge having at least three spaced holes extending vertically therethrough and removably receiving the posts, the holes in the grill top being substantially the shape of a portion of a circle on those sides thereof which face the adjacent edge of the grill top to provide holes of a shape for resisting tearing of the thin grill top material, the posts having substantially vertical sides so that the grill top can be placed vertically downward on the posts with equal ease by an operator standing on any side of the grill top.

BRIEF DESCRIPTION OF THE DRAWING

FIG. 1 is a top plan view of the grill top of this invention, its anchoring means, and an anchoring means, support frame.

FIG. 2 is a side elevation of the parts shown in FIG. 1 showing also the grill, fire holder, and notched adjustment posts thereon.

FIG. 3 is a side elevation of the grill top. DESCRIPTION OF THE PREFERRED EMBODIMENT A grill of this invention is generally indicated at 10 in FIG. 2 and comprises a fire holder 14 supported on legs 15, the fire holder being of a conventional cup-shape, open at the top, and of rectangular shape in top plan view.

A thin grill top made in accordance with this invention is shown at 20 and has a substantially horizontal upper side 22.

The grill top 20 is rectangular and has a plurality of spaced holes 26 disposed around its outer edge, the holes 26 being at least three in number and each defining an anchoring point on the edge of the grill top 20, those sides of the holes 26 which face the outermost respective adjacent sides of the grill top being substantially the shape of a portion of a circle for closely fitting and conforming to the cylindrical shape of posts 40 which are vertically disposed with vertical sides and which are adapted to be received in the holes 26 whereby the holes 26 and the posts 40 together form an anchoring means generally indicated at 50 which is disposed in anchoring engagement with the grill top at at least three spaced anchor points defined by the positions of the holes 26, the said at least three anchor points being arranged so that they outline a horizontal area, which latter is greater than the area of at least one steak serving of substantial size.

The anchoring means 50, comprising post 40 and the holes 26, is removable from engagement with the grill top whereby the grill top can be removed from the post 40 for disposal.

The grill top 20 has perforations 54 therethrough and arranged in a uniform manner to form a conventional grid in top plan view, although the grid in this case is formed of sheet metal so thin that the grill top 20 would hardly even be seen from a short distance away from the grill.

The grill openings 54 serve the usual purposes of grill openings by allowing the heat from the fire to have direct access to the meat and by permitting the fat drippings from the meat to fall therethrough into the fire.

An anchoring means support frame generally indicated at 100 is disposed beneath the grill top 20 and supports the grill top 20. The anchoring means support frame 100 is rectangular in shape in the illustration shown in the drawings because the grill top is also of rectangular shape so that edges of the grill top overlap edges of the annular anchoring means support frame 100. The posts 26 are attached to the lower end of the anchoring means support frame 100, whereby the upper side of the support frame 100 serves as a stop means spaced downwardly from the top of each post for engaging the underside of the grill top to uphold the grill top and prevent it from falling downwardly.

The grill top 20 has what can be called a central meat-receiving portion which is unsupported, and this central meat-receiving portion can be defined as being disposed inwardly from the inner sides of the grill frame 100, such inner sides being seen in dotted lines at 120 and 122 in FIG. 1, and the meat-receiving central portion can be referred to by the numeral 110 and can be further defined as being disposed between at least three posts 40 which define an area greater than the area of at least one steak serving of substantial size.

A sample of an "at least three posts or anchor points" is shown in FIG. 1 by the posts and holes indicated at A, B, and C.

It is to be understood, however, that many more posts and their anchor posts can be used, as shown, to the end that they define the entire area of the grill top for receiving many steak servings.

A central meat-receiving portion of the grill top 110, as thus defined, is unsupported by means other than its own strength, or in other words, by any other means other than other portions of the grill top itself.

The unsupported central portion of the grill top 110 is of such a large area and the grill top can be defined as having strength but being so thin and so flexible and lacking in stiffness for achieving economical disposability, that to support meat adequately proportional to the area of its unsupported central meat-receiving portion 110, the edges of the grill top, at at least the three spaced points A, B, and C must be prevented by means substantially more adequate than mere support of the undersurface of edges thereof, from moving inwardly due to a bending of the grill top. In other words, the use of only two anchoring points such as A and C would not be sufficient because with these plates on the grill top, the grill top would simply sag like a piece of typewriter paper which is held only at two points and then weighted on its unsupported area.

The support frame 100 has four loops, two at each of two opposite ends, and shown at 130, which extend horizontally outward therefrom and are fastened to the frame 100, each loop being adapted to rest upon a projection 134 of a post 140 so as to be received in the notch 142 in the post.

The four posts 140 serve as a mounting means with their lower ends mounted on the fire holder for supporting the grill frame 100 so as to hold the grill top 20 above a fire-supporting surface 150 which is the bottom of the inside of a cup-shaped fire holder 14, the hollow interior of the latter being shown at 152.

The grill will support meat in the maximum quantity normally grilled in an area like the area of said unsupported central portion. Sometimes grills are used to support not only hamburgers and steaks, but also roasts.

The preferred form of the grill top 20 is very thin sheet metal with its perforations 54 punched out.

I claim:

1. A grill comprising a fire holder having a fire-supporting surface, a grill top having a substantially horizontal upper side, anchoring means disposed in anchoring engagement with said grill top at at least three spaced anchor points on the edge of said grill top, said points being arranged so as to outline a horizontal area which latter is greater than the area of at least one steak serving of substantial size, said anchoring means being removable from engagement with said grill top whereby said grill top can be removed therefrom for disposal, said grill top having perforations extending vertically through its central portion for the usual purposes of grill openings, said anchoring means upholding said grill top, upholding means carried by said fire holder and mounting said anchoring means above said fire supporting surface, said grill top having a central meat-receiving portion disposed in the area thereof bounded by said anchoring points, said central portion of said grill top being unsupported by means other than its own strength, said unsupported central portion being of such a large area and said grill top having strength but being so thin and so flexible and lacking in stiffness for achieving economical disposability that to support meat adequately proportional to the area of its unsupported central meat-receiving portion, the edges of said grill top, at at least said three spaced points, must be prevented by means substantially more adequate than mere support of the undersurface of edges thereof, from moving inwardly due to a bending of the grill top.

2. The combination of claim 1 in which said anchoring means comprises: at least three spaced upwardly extending posts at said points and said grill top having at least three spaced holes extending vertically therethrough adjacent edges of said grill top, said holes removably receiving said posts whereby said grill top can be removed from said posts, and said support having stop means spaced downwardly from the top of each post for engaging the underside of said grill top to uphold said grill top.

3. The combination of claim 2 in which said posts have substantially vertical sides.

4. The combination of claim 2 in which said upholding means comprises an anchoring means support frame spaced above said fire-supporting surface and mounting means mounted on said fire holder surface, said frame being rested on said mounting means.

5. The combination of claim 4 in which said stop means is in the upper side of said frame.

6. The combination of claim 4 in which said frame is annular.

7. The combination of claim 2 in which said posts have substantially vertical sides and in which the holes in said grill top each are substantially of the shape of a portion of a circle on those sides thereof which face the adjacent edge of said grill top.

8. The combination of claim 1 in which said grill top is so flexible that if its edges were bent down over a fixed frame so that the lowermost parts of its edges are approximately vertical then this would not provide a sufficient anchoring effect to uphold an amount of meat on said unsupported central portion without the assistance of other anchoring means which said amount of meat is the maximum quantity normally grilled in an area like the area of said unsupported central portion.

9. The combination of claim 1 in which said anchor means has such an anchoring relationship with said cover that said cover will tear before said anchoring relationship can be otherwise destroyed by an excessive meat load on said cover.